United States Patent
Chou

(10) Patent No.: US 8,638,298 B2
(45) Date of Patent: Jan. 28, 2014

(54) COMPUTER MOUSE AND METHOD THEREOF

(75) Inventor: Chun-Hung Chou, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 446 days.

(21) Appl. No.: 12/952,216

(22) Filed: Nov. 23, 2010

(65) Prior Publication Data

US 2012/0086639 A1   Apr. 12, 2012

(30) Foreign Application Priority Data

Oct. 7, 2010   (CN) .......................... 2010 1 0299016

(51) Int. Cl.
   *G06F 3/033*   (2013.01)
(52) U.S. Cl.
   USPC .................. 345/163; 345/157; 200/61.45 R; 200/61.53
(58) Field of Classification Search
   USPC ........................................................ 345/163
   See application file for complete search history.

(56) References Cited

U.S. PATENT DOCUMENTS

| | | | | |
|---|---|---|---|---|
| 4,425,488 A * | 1/1984 | Moskin et al. | ................ | 200/220 |
| 4,698,626 A * | 10/1987 | Sato et al. | ...................... | 345/166 |
| 5,119,077 A * | 6/1992 | Giorgio | .......................... | 345/163 |
| 5,153,571 A * | 10/1992 | Takahashi | ..................... | 345/163 |
| 5,841,425 A * | 11/1998 | Zenz, Sr. | ....................... | 345/163 |
| 6,310,607 B1 * | 10/2001 | Amemiya | ..................... | 345/163 |
| 6,313,417 B1 * | 11/2001 | Schnell | ....................... | 200/61.47 |
| 6,323,446 B1 * | 11/2001 | Schnell | ....................... | 200/61.52 |
| 6,348,665 B1 * | 2/2002 | Ohashi et al. | .............. | 200/61.52 |
| 6,621,019 B1 * | 9/2003 | Narasimhan | ............... | 200/61.47 |
| 6,706,980 B1 * | 3/2004 | Narasimhan | ............... | 200/61.47 |
| 6,933,922 B2 * | 8/2005 | Casebolt et al. | .............. | 345/157 |
| 7,504,599 B1 * | 3/2009 | Chesters | ................. | 200/61.45 R |
| 7,729,544 B2 * | 6/2010 | Lin | ................ | 382/209 |
| 7,999,789 B2 * | 8/2011 | Ha et al. | ........................ | 345/156 |
| 2003/0024797 A1 * | 2/2003 | Ogden | ........................ | 200/61.47 |
| 2003/0169235 A1 * | 9/2003 | Gron et al. | ..................... | 345/167 |
| 2006/0283694 A1 * | 12/2006 | Tsuruoka et al. | .......... | 200/61.52 |
| 2008/0218090 A1 * | 9/2008 | Yoo et al. | .................... | 315/169.3 |
| 2009/0002269 A1 * | 1/2009 | Heisch | ............................ | 345/31 |
| 2009/0066931 A1 * | 3/2009 | Kang et al. | ................... | 356/5.08 |
| 2010/0026627 A1 * | 2/2010 | Arai et al. | ..................... | 345/163 |
| 2010/0207882 A1 * | 8/2010 | Bruneau et al. | ............... | 345/161 |

* cited by examiner

*Primary Examiner* — Alexander S Beck
*Assistant Examiner* — Sejoon Ahn
(74) *Attorney, Agent, or Firm* — Altis Law Group, Inc.

(57) ABSTRACT

A method for a mouse is provided. The mouse includes a housing, a timing unit. A container is secured in the housing. The container is full of insulated liquid. A sphere suspends in the liquid. First sensors and second sensors are attached to the container. Each first sensors is charged, each second sensors is uncharged. The first sensors are spaced from each other by one second sensor. When any adjacent first sensor and second sensor are simultaneously contacted by the sphere, the contacted second sensor is thus charged. The method includes: determining whether any second sensor is charged; generating a position signal, controlling the timing unit to time within the period the any second sensor being charged; determining the movement direction of the a cursor; determining the movement distance of the cursor; and generating cursor control signal for controlling movement of the cursor.

3 Claims, 5 Drawing Sheets

COMPUTER MOUSE AND METHOD THEREOF

BACKGROUND

1. Technical Field

The present disclosure relates to computer peripherals and, particularly, to a computer mouse capable of working without a support surface and a method thereof.

2. Description of Related Art

As one of the main input devices for a computer, computer mice have become an inseparable part of desktop computer systems. A standard mouse needs to work in tandem with a support surface, which is not completely convenient. 3D mice can work without a support surface, however, 3D mice are relatively expensive.

BRIEF DESCRIPTION OF THE DRAWINGS

The components of the drawings are not necessarily drawn to scale, the emphasis instead being placed upon clearly illustrating the principles of a mouse and method thereof. Moreover, in the drawings, like reference numerals designate corresponding parts throughout several views.

DETAILED DESCRIPTION

Figure 1:
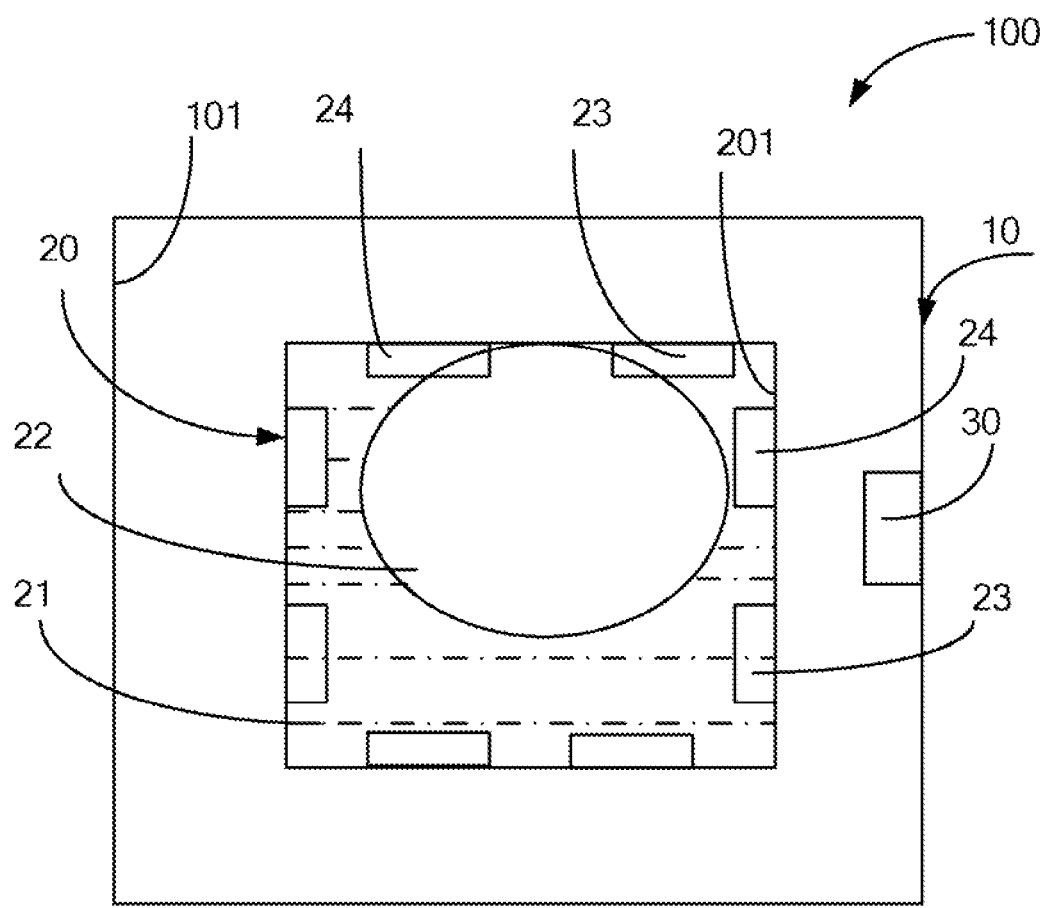
FIG. 1 is a schematic view of a mouse in accordance with an exemplary embodiment.

Embodiments of the present disclosure will now be described in detail below, with reference to the accompanying drawings. Referring to FIG. 1, a computer mouse 100 (hereinafter referred to as "the mouse") includes a housing 10 and a container 20 secured within the housing 10. The container 20 is sealed and hollow. The container 20 is full of insulative liquid 21. A sphere 22 is suspended in the container 20 by the liquid 21. When the mouse 100 is moved forward, the sphere 22 moves backward relative to the mouse 100 from inertia. In the embodiment, the density of the liquid 21 is equal to that of the sphere 22. The sphere 22 is made of conductive material. In the embodiment, the container 20 is substantially cubic. The diameter of the sphere 22 is slightly less than a length of the container 20.

A number of first sensors 23 and second sensors 24 are attached to inner sidewalls 201 of the container 20. The first sensors 23 and the second sensors 24 are evenly distributed on the sidewalls 201, two adjacent first sensors 23 along the inner sidewalls 201 are spaced from each other by one second sensor 24, and vice versa. Each first sensor 23 is a charged contact, each second sensor 24 is an uncharged contact. In the embodiment, four first sensors 23 and four second sensors 24 are deployed, and one first sensor 23 and one second sensor 24 are attached to one sidewall 201. The number of the first sensors 23 and the second sensors 24 can vary according to need. When any adjacent first sensor 23 and second sensor 24 are simultaneously contacted by the sphere 22, the contacted first sensor 23 and the contacted second sensor 24 are electrically connected to each other, the contacted second sensor 24 is thus charged.

The mouse 100 further includes a number of buttons (not shown) on the housing 10 for computer programmed click-function.

Figure 2:
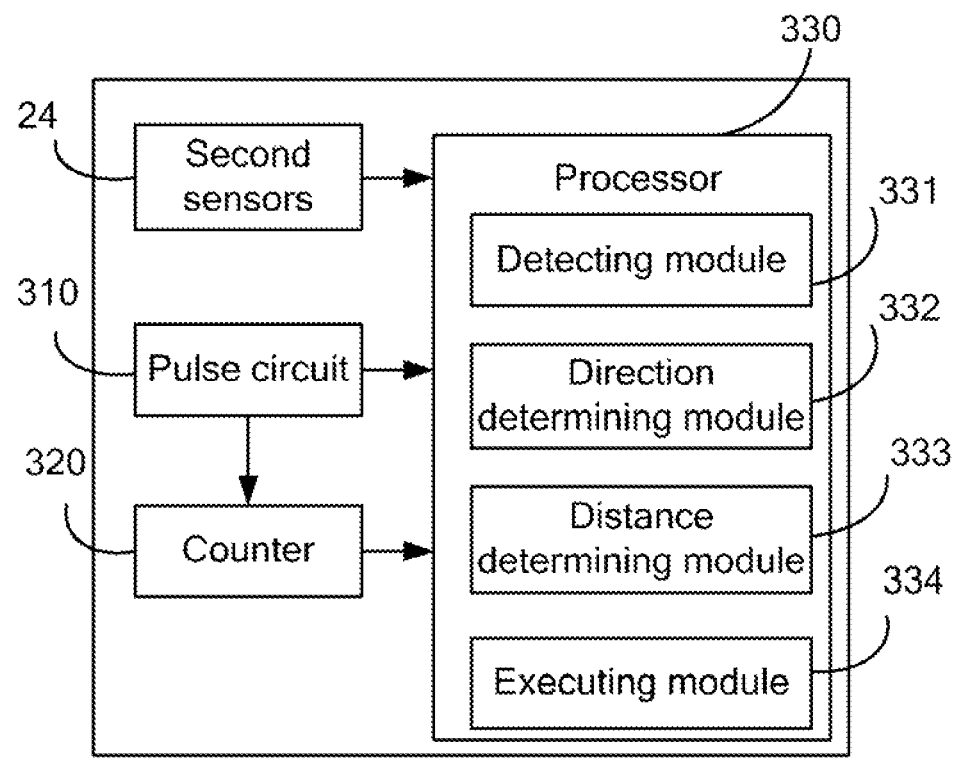
FIG. 2 is a block diagram of the mouse of FIG. 1 in accordance with an exemplary embodiment.

The mouse 100 further includes a circuit board 30. Referring to FIG. 2, the circuit board 30 includes a pulse circuit 310, a counter 320, and a processor 330. The pulse circuit 310 generates pulse signals. The counter 320 is electrically connected to the pulse circuit 310 to count the number of the pulse signals.

The processor 330 includes a detecting module 331, a direction determining module 332, a distance determining module 333, and an executing module 334.

The detecting module 331 is electrically connected to the second sensors 24, the pulse circuit 310, and the counter 320. The detecting module 331 is configured to determine whether any second sensor 24 is charged, direct the pulse circuit 310 to generate pulse signals within the period of the second sensor 24 being charged, and then direct the counter 320 to calculate the number of the pulse signals. The detecting module 331 further generates a position signal recording the position of the charged second sensor 24. The detecting module 331 is further configured to reset the counter 320 when the charged second sensor 24 becomes uncharged.

The direction determining module 332 is configured to determine the movement direction of a cursor according to the position signal generated by the detecting module 331. For example, when the mouse 100 is moved forward, the sphere 22 moves backward to contact the rear first sensor 23 and second sensor 24. The contacted second sensor 24 is thus charged. The detecting module 331 generates a position signal recording the position of the contacted second sensor 24. The direction determining module 332 then determines that the mouse 100 is moved forward according to the position signal.

The distance determining module 333 is configured to determine the movement distance of the cursor according to the number of pulse signals and a first table showing below. The table is stored in a storage unit (not shown). The table includes a first column recording different numbers of the pulse signals and a second column recording different movement distances of the cursor. The movement distance is equal to the number of pixels. Each movement distance of the cursor corresponds to one pulse signal.

| First Table | |
|---|---|
| Number of the pulse signals | Movement distance of the cursor |
| 1 | 4 pixel |
| 2 | 8 pixel |
| ... | ... |
| n | 2n pixel |

The executing module 334 is configured to generate cursor control signals for controlling movement of the cursor according to the determined movement direction and determined movement distance.

Figure 3:
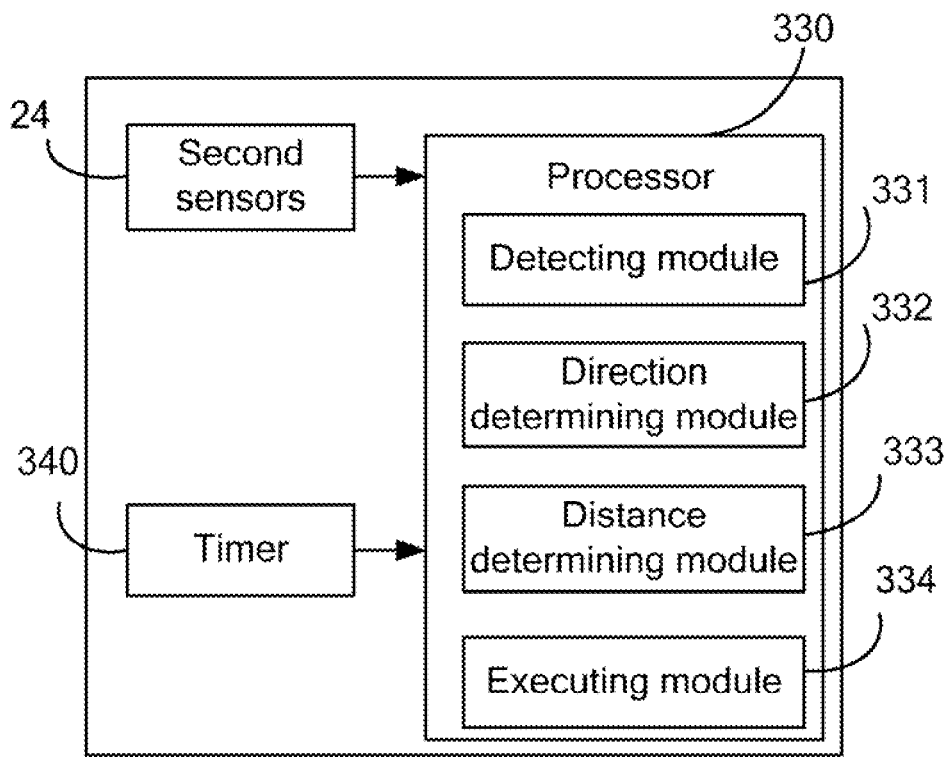
FIG. 3 is another block diagram of the mouse of FIG. 1 in accordance with another exemplary embodiment.

Referring to FIG. 3, in an alternative embodiment a timer 340 replaces the pulse circuit 310 and the counter 320. The timer 340 is electrically connected to the processor 330. The detecting module 331 is configured to control the timer 340 to time within the period of one second sensor 24 being charged. The detecting module 331 further resets the timer 340 when the charged second sensor 24 becomes uncharged. The distance determining module 333 determines the movement distance of the cursor according to the time timed by the timer 340 and a second table shown as below. The second table is stored in the storage unit. The second table includes a first column recording different time and a second column recording different movement distances. The movement distance is equal to the number of pixels. Each time corresponds to one movement distance.

| Second Table | |
|---|---|
| Time | Movement distance of the cursor |
| 1 | 5 pixel |
| 2 | 10 pixel |
| ... | ... |
| n | 5n pixel |

Figure 4:
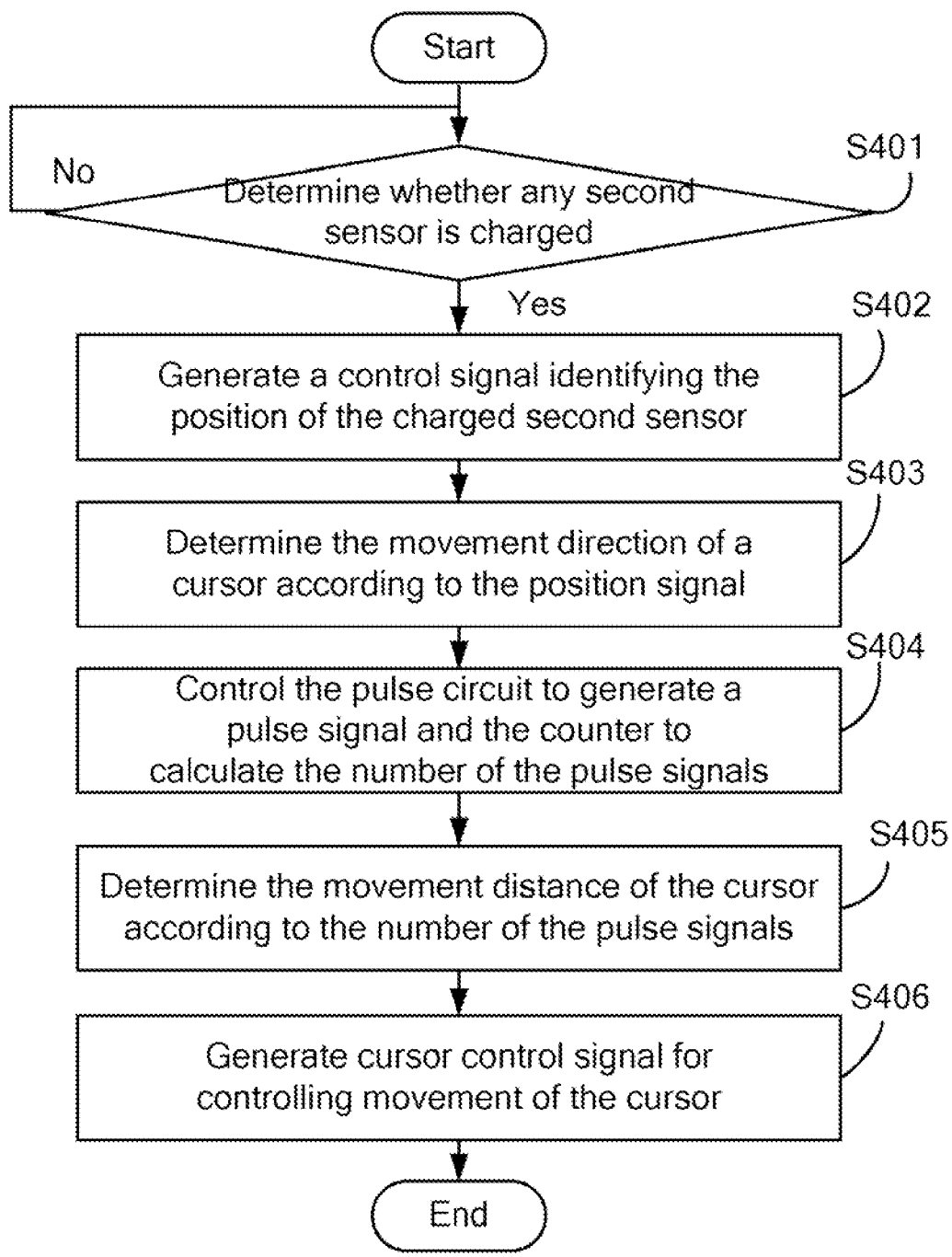
FIG. 4 is a flowchart of a method for illustrating work principle of the mouse of FIG. 2 in accordance with an exemplary embodiment.

FIG. 4 is a flowchart of a method for illustrating the work principle of the mouse 100 in accordance with an exemplary embodiment.

In step S401, the detecting module 331 detects whether any second sensor 24 is charged. If yes, the procedure goes to step S402. If no, the procedure repeats step S401.

In step S402, the detecting module 331 generates a position signal recording the position of the charged second sensor 24.

In step S403, the direction determining module 332 determines the movement direction of the cursor according to the position signal.

In step S404, the detecting module 331 controls the pulse circuit 310 to generate a pulse signal within the period of the charged second sensor being uncharged, and control the counter 320 to calculate the number of the pulse signals.

In step S405, the distance determining module 333 determines the movement distance of the cursor according to the number of the pulse signals.

In step S406, the executing module 334 generates cursor control signal for controlling the movement of the cursor according to the determined movement direction and the determined movement distance.

Figure 5:
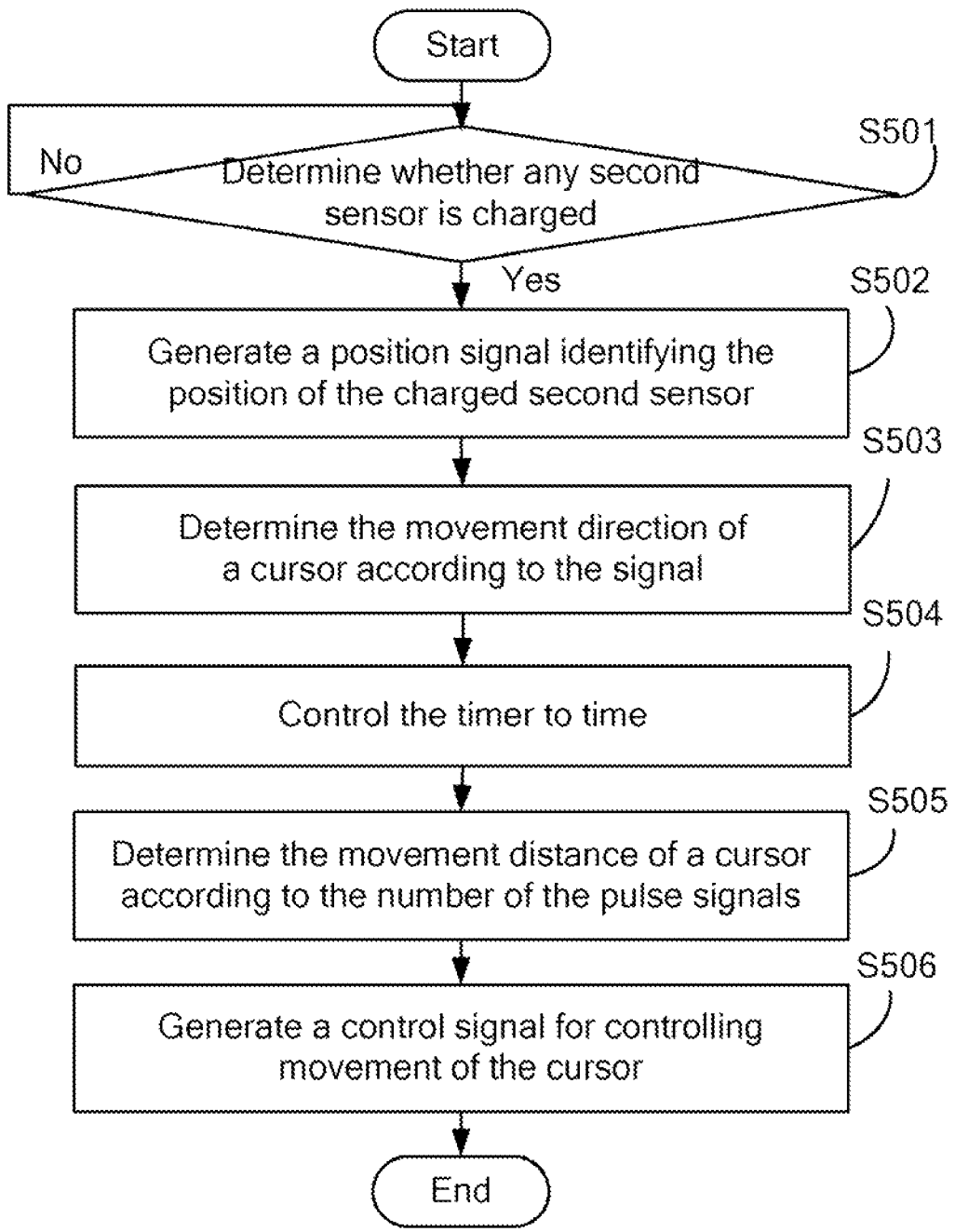
FIG. 5 is another flowchart of a method for illustrating work principle the mouse of FIG. 3 in accordance with another exemplary embodiment.

Referring to FIG. 5, an alternative method for illustrating work principle of the mouse in accordance with another embodiment.

In step S501, the detecting module 331 detects whether any second sensor 24 is charged. If yes, the procedure goes to step S502. If no, the procedure repeats.

In step S502, the detecting module 331 generates a position signal recording the position of the charged second sensor 24.

In step S503, the direction determining module 332 determines the movement direction of the cursor according to the position signal recording the position of the charged second sensor 24.

In step S504, the detecting module 331 controls the timer 340 to time within the period of the charged second sensor being uncharged.

In step S505, the distance determining module 333 determines the movement distance of the cursor according to the time timed by the timer 340.

In step S506, the executing module 334 generates cursor control signal for controlling movement of the cursor according to the determined movement direction and the determined movement distance.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A mouse comprising:
a housing;
a container secured in the housing and full of insulative liquid;
a sphere suspended in the liquid, the sphere being made of conductive material;
a plurality of first sensors and a plurality of second sensors being attached to inner sidewalls of the container, each of the first sensors being a charged contact, each of the second sensors being an uncharged contact, adjacent two of the plurality of first sensors being spaced from each other by a second sensor of the plurality of the second sensors, and adjacent two of the plurality of second sensors being spaced from each other by one of the plurality of the first sensors, when any of the first sensors and any of the second sensors being simultaneously contacted by the sphere, the contacted second sensor being charged;
a timing unit configured to time the time, and comprising a pulse circuit and a counter;
a processor comprising:
a detecting module electrically connected to the second sensors, configured to determine whether any one of the second sensors is charged, direct the timing unit to time the time during the period of any second sensor being charged, and further generate a position signal recording the position of the charged second sensor, and further configured to direct the pulse circuit to generate pulse signals during the period of any one of the second sensor being charged, direct the counter to calculate the number of the pulse signals;
a direction determining module configured to determine the movement direction of a cursor according to the position signal generated by the detecting module;
a distance determining module configured to determine the movement distance of the cursor according to the time timed by the timing unit and a table, and further configured to determine the movement distance of the cursor according to the number of the pulse signals and a first table, the first table comprising a first column recording the number of the pulse signals, and a second column recording the movement distance of the cursor, the movement distance corresponding to a number of pixels, each one of pulse signals corresponding to one movement distance of the cursor; and
an executing module configured to generate cursor control signal for controlling movement of the cursor according to the determined movement direction and the determined movement distance.

2. A mouse comprising:
a housing;
a container secured in the housing and full of insulative liquid;
a sphere suspended in the liquid, the sphere being made of conductive material;
a plurality of first sensors and a plurality of second sensors being attached to inner sidewalls of the container, each of the first sensors being a charged contact, each of the second sensors being an uncharged contact, adjacent two of the plurality of first sensors being spaced from each other by a second sensor of the plurality of the second sensors, and adjacent two of the plurality of second sensors being spaced from each other by one of the plurality of the first sensors, when any of the first sensors and any of the second sensors being simultaneously contacted by the sphere, the contacted second sensor being charged;
a timing unit comprising a timer to time the time;
a processor comprising:
  a detecting module electrically connected to the second sensors, configured to determine whether any one of the second sensors is charged, direct the timing unit to time the time during the period of any second sensor being charged, and further generate a position signal recording the position of the charged second sensor, and further configured to direct the timer to time the time during the period of any one of the second sensor being charged;
  a direction determining module configured to determine the movement direction of a cursor according to the position signal generated by the detecting module;
  a distance determining module configured to determine the movement distance of the cursor according to the time timed by the timing unit and a table, and further configured to determine the movement distance of the cursor according to the time timed by the timer and a second table, the second table comprising a first column recording time and a second column recording movement distance of the cursor, the movement distance corresponding to the number of pixels, each one corresponding to one movement distance; and
  an executing module configured to generate cursor control signal for controlling movement of the cursor according to the determined movement direction and the determined movement distance.

3. A method for a mouse, the mouse comprising a housing, a container secured in the housing, the container being full of insulative liquid, a sphere suspended in the liquid, the sphere being made of conductive material, a plurality of first sensors and second sensors being attached to the inner sidewalls of the container, each of the first sensors being a charged contact, each of the second sensors being an uncharged contact, adjacent two of the plurality of the first sensors being spaced from each other by one second sensor of the plurality of the second sensors, and adjacent two of the plurality of second sensors being spaced from each other by one of the plurality of the first sensors, when any adjacent first sensor and second sensor being simultaneously contacted by the sphere, the contacted second sensor being thus charged, a timing unit configured to time the time and comprising a pulse circuit and a counter, the pulse circuit configured to generate pulse signals, the counter configured to count the number of the pulse signals, the method comprising:
  determining whether any one of the second sensors is charged;
  if one second sensor is charged, generating a position signal identifying the position of the charged second sensor, controlling the timing unit to time within the period of the charged second sensors being uncharged, and controlling the counter to calculate the number of the pulse signals; and further controlling the pulse circuit to generate pulse signals during the period of any second sensor being charged, and controlling the counter to count the number of the pulse signals;
  determining the movement direction of the a cursor according to the position signal recording the position of the charged second sensor;
  determining the movement distance of the cursor according to the time timed by the timer and a table, and further determining the movement distance of the cursor according to the number of the pulse signals and a first table, the first table comprising a first column recording the number of the pulse signals and a second column recording the movement distance, the movement distance corresponding to a number of pixels, each pulse signal corresponding to one movement distance; and
  generating cursor control signal for controlling movement of the cursor according to the determined movement direction and the determined movement distance.

\* \* \* \* \*